US006401133B1

(12) United States Patent
York

(10) Patent No.: US 6,401,133 B1
(45) Date of Patent: Jun. 4, 2002

(54) SYSTEM FOR HIGH SPEED CONTINUOUS FILE TRANSFER PROCESSING OF DATA FILES

(75) Inventor: Kenneth Lindsay York, Huntington Valley, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/104,115

(22) Filed: Jun. 24, 1998

(51) Int. Cl.[7] .............................................. G06F 15/16
(52) U.S. Cl. ....................... 709/247; 709/246; 709/208
(58) Field of Search ................................. 709/208, 210, 709/247, 246; 364/715.02; 370/521, 465, 473; 382/235; 707/101; 708/203

(56) References Cited

U.S. PATENT DOCUMENTS

| | | | | |
|---|---|---|---|---|
| 4,302,838 A | * | 11/1981 | Eng et al. ..................... 370/517 |
| 4,669,097 A | * | 5/1987 | Bristol ........................ 375/240 |
| 5,357,614 A | | 10/1994 | Pattisam et al. ............. 395/250 |
| 5,374,916 A | * | 12/1994 | Chu ......................... 340/146.2 |
| 5,384,829 A | * | 1/1995 | Heileman et al. ......... 379/88.26 |
| 5,455,576 A | * | 10/1995 | Clark II et al. ............... 341/50 |
| 5,555,377 A | * | 9/1996 | Christensen et al. ........ 709/247 |
| 5,563,649 A | * | 10/1996 | Gould et al. .............. 348/14.13 |
| 5,572,605 A | * | 11/1996 | Toraichi ..................... 382/241 |
| 5,655,146 A | * | 8/1997 | Baum et al. .................... 710/5 |
| 5,673,322 A | * | 9/1997 | Pepe et al. ..................... 380/49 |
| 5,680,400 A | | 10/1997 | York .......................... 370/473 |
| 5,696,920 A | * | 12/1997 | Miyata et al. ............... 712/201 |
| 5,706,489 A | | 1/1998 | Chi et al. .................... 395/569 |
| 5,722,999 A | * | 3/1998 | Snell ........................... 607/32 |
| 5,748,904 A | * | 5/1998 | Huang et al. ................ 709/247 |
| 5,771,340 A | * | 6/1998 | Nakazato et al. .......... 358/1.15 |
| 5,805,932 A | * | 9/1998 | Kawashima et al. .......... 710/68 |
| 5,812,790 A | * | 9/1998 | Randall ....................... 709/247 |
| 5,815,793 A | * | 9/1998 | Ferguson .................... 725/131 |
| 5,838,927 A | * | 11/1998 | Gillon et al. ................ 709/247 |
| 5,838,964 A | * | 11/1998 | Gubser ........................ 707/101 |
| 5,884,028 A | * | 3/1999 | Kindell et al. ............... 709/234 |
| 5,917,948 A | * | 6/1999 | Holtz et al. .................. 382/323 |
| 5,931,928 A | * | 8/1999 | Brennan et al. .............. 710/68 |
| 5,956,490 A | * | 9/1999 | Buchholz et al. ........... 709/245 |
| 6,006,191 A | * | 12/1999 | DiRienzo ........................ 705/2 |
| 6,008,743 A | * | 12/1999 | Jaquette ........................ 341/51 |
| 6,021,198 A | * | 2/2000 | Anigbogu et al. .......... 380/269 |
| 6,141,053 A | * | 10/2000 | Saukkonen ............ 375/240.01 |
| 6,141,701 A | * | 10/2000 | Whitney ........................ 710/5 |

OTHER PUBLICATIONS

Sheinwald, D. et al. "On Compression with Two–way Head Machines", IEEE Data Compression Conf., ISBN: 0–8186–9202–2, pp. 218–227, Apr. 1991.*
Woods, J. "PPP Deflate Protocol", RFC 1979, pp. 1–9, Aug. 1996.*
Gonzato, Guido "From DOS to Linux HOWTO", v1.0, pp. 18, Dec. 1996.*

* cited by examiner

Primary Examiner—Robert B. Harrell
Assistant Examiner—Jason D. Cardone
(74) Attorney, Agent, or Firm—John B. Sowell; Mark T. Starr

(57) ABSTRACT

In a system for economically and continuously transmitting data files from one location to a remote location there is provided a high speed mainframe computer adapted to read a data file and to determine if the process to be performed on the data requires a large amount of mainframe processor cycle time. If so the data file is down loaded to a memory accessible by a much less expensive single chip type dedicated computer that is particularly well suited to perform the process that would require high mainframe processor time cost. The output of the dedicated computer in coupled to a communication network for transmittal to the remote location. In the preferred embodiment-of the present invention first-in-first-out (FIFO) data queues are employed to maintain optimum utilization of the dedicated computer and transfer of the data files.

11 Claims, 2 Drawing Sheets

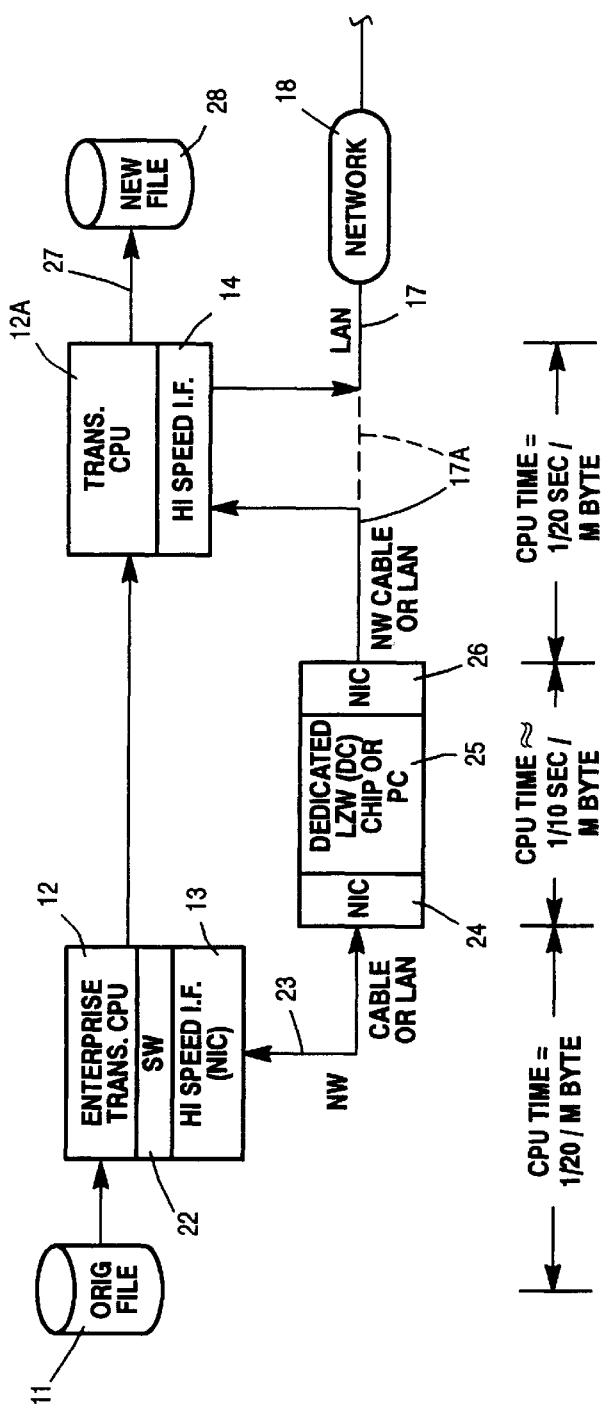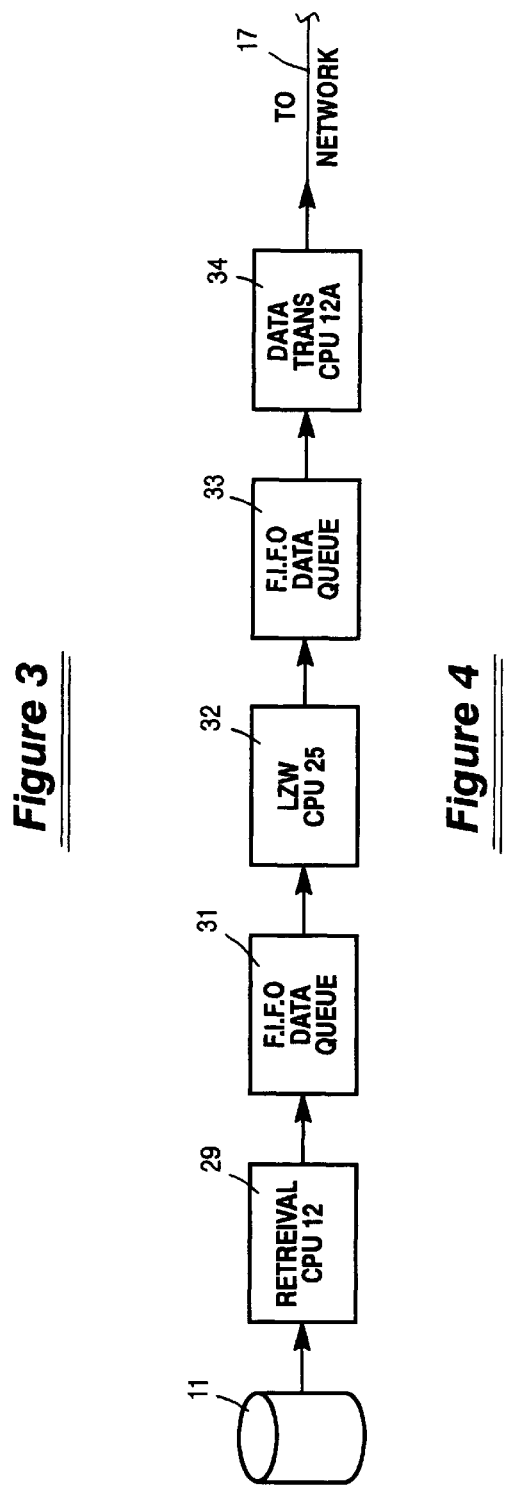

SYSTEM FOR HIGH SPEED CONTINUOUS FILE TRANSFER PROCESSING OF DATA FILES

RELATED APPLICATION

The present invention relates to my copending U.S. application Ser. No. 09/104,116 filed June 1998 for Integrated Block Checking System for Rapid File Transfer of Compressed Data.

BACKGROUND OF THE INVENTION

1. Field of the Invention

The present invention relates to the transfer of data files from a first location to a second remotely located data file. More particularly, the present invention relates to a high-speed cost-effective data file transfer system.

2. Description of the Prior Art

Systems for transferring data to a centrally located enterprise system from remotely located-areas over various links or networks are well known in the prior art and are classified in class 370, subclasses 260+, 465+ and 536+. One such system is shown and described in my U.S. Pat. No. 5,680,400 which is assigned to the same assignee as the present invention and is incorporated by reference herein. One purpose of this system is to split the data stream into a plurality of parallel streams for an asynchronous data transfer over slow parallel networks or links for the purpose of speeding up the total flow of data over slow networks. When plural slow networks are accessible, the division of the data into plural parallel streams can speed up the flow of data transfer. Over long routes, plural slow networks may appear in the overall transmission paths being used and other means for speeding up the data transfer may be employed.

There are other bottle necks to be found in data transmission systems which were heretofore ignored. Many large general purpose mainframes computer systems often employ expensive transaction processing computers. Such expensive. transaction processing computers serve their main purpose very well but when used to perform certain other tasks do not perform as well as other much less expensive one chip computers. When such a mainframe computer is in an enterprise system, a multiple processing system or a stand alone configuration and is also used to perform these certain other "difficult" tasks, they are performed at a higher economical cost than is necessary. Further, when the mainframe computer is functionally placed in a series path of the data transmission flow, the rate of data transfer is attenuated by the increase computational time cost of the slower computer.

An example will illustrate the point. The time required for a typical large expensive mainframe transaction computer to perform a certain process and formatting tasks have been measured to be between 1.5 and 2 seconds of computer processing per mega byte of data where the identical process has been and is capable of being performed in less than $\frac{1}{20}^{th}$ of this time by use of a dedicated one chip general purpose processor.

Accordingly it will be highly desirable to provide in an expensive mainframe computing system a method and apparatus for identifying these certain difficult and highly processor cycle intensive tasks and providing means for off loading such difficult tasks to a dedicated microprocessor or single chip computer in a manner which unburdens the mainframe computer of the difficult task without a time cost penalty.

SUMMARY OF THE INVENTION

It is a primary object of the present invention to provide a computing system having at least one high cost mainframe computer coupled to a low cost high speed dedicated computer chip or microprocessor or PC for performing difficult processing tasks which run much faster on the dedicated computer.

It is another primary object of the present invention to provide a low cost accelerating processor coupled to a high cost mainframe computer for performing certain difficult tasks that are capable of being performed on the mainframe computer at high processor time costs.

It is another primary object of the present invention to provide in an expensive mainframe computer system means for determining difficult time consuming tasks which can be run both faster and cheaper on a dedicated and low cost computer.

It is another primary object of the present invention to provide in a computing system a method and means for off-loading difficult tasks assigned to one computer to a dedicated computer which can more efficiently run a difficult task.

It is the general object of the present invention to provide a processing system for continuously processing a stream of data extracted from a data file through two different types of computers to while significantly enhancing the speed or rate of processing the stream of data.

According to these and other objects of the present invention there is provided a mainframe computer for accessing data from a data file and for producing a data stream to be processed and transmitted to a user source in a most efficient manner. A low cost dedicated processor is coupled in the output data stream of the mainframe computer. The process to be performed by the mainframe computer is examined and that stage of the process which is identified as a difficult process is not performed on the data stream in the mainframe computer but it performed down stream by the dedicated processor, whereby the total process to be performed by the mainframe computer is performed both faster and cheaper by the combination of the two computers. The cost of the downstream computer is insignificant in comparison compared to the mainframe computer.

BRIEF DESCRIPTION OF THE DRAWINGS

FIG. 3 is a schematic block diagram of the present invention system showing a continuous flow of data in a data retrieval and transport system having a low cost dedicated processor connectable in one of the data pipe line paths when needed to perform difficult tasks; and FIG. 4 is a schematic block diagram showing the steps employed in the data pipeline or data stream to achieve a continuous flow of data in an asynchronous mode of operation.

DETAIL DESCRIPTION OF THE PREFERRED EMBODIMENT

Figure 1:
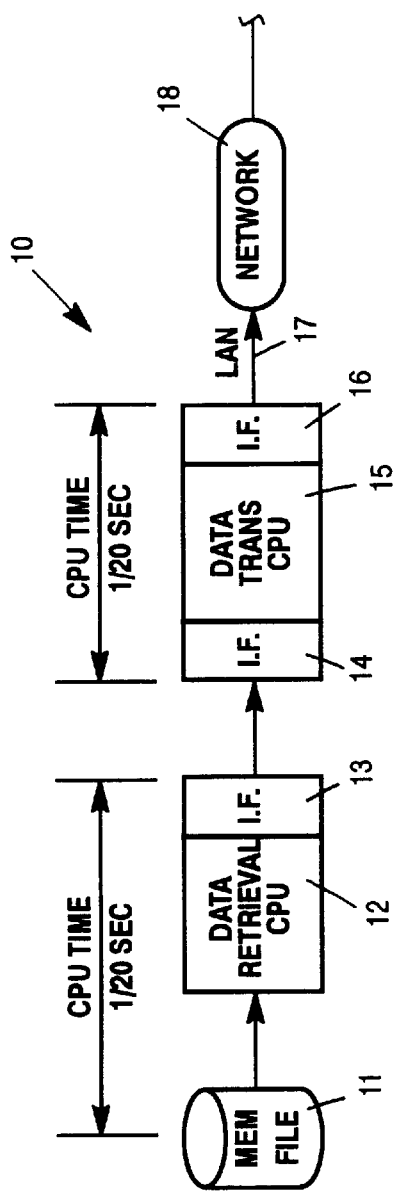
FIG. 1 is a schematic block diagram of the prior art mainframe computer showing the CPU time required to process 1.0 mega bytes in a data stream.

Refer now to FIG. 1 showing a block diagram of a prior art mainframe computer system 10 which comprises a memory file 11 that is coupled to a data retrieval CPU 12. CPU 12 is shown provided with an interface 13 which is coupled to an interface 14 on a data transmission CPU 15 which may be the same as CPU 12. CPU 15 is shown-provided with an interface 16 which couples to a local area network 17 or other link which connects toga network 18. It will be understood that the network 18 may be coupled to a remote computing system located almost anywhere in the world.

A feature of the data retrieval computer 12 is that it is capable of retrieving data and transporting data at a extremely high rate of speed. FIG. 1 shows that the CPU time for retrieving one mega byte of data is approximately $\frac{1}{20}^{th}$ of 1 second. When this data is retrieved it is in the form of a data stream and may be transmitted directly through an interface 13 to the data transaction CPU 15 which may be the same computer 12 and its transaction time for each mega byte of data in the data stream is also approximately $\frac{1}{20}^{th}$ of 1 second. Thus the overall time to extract or retrieve the data from the memory file 11 and present it to the LAN network 17,18 is approximately $\frac{1}{10}^{th}$ of 1 second.

Figure 2:
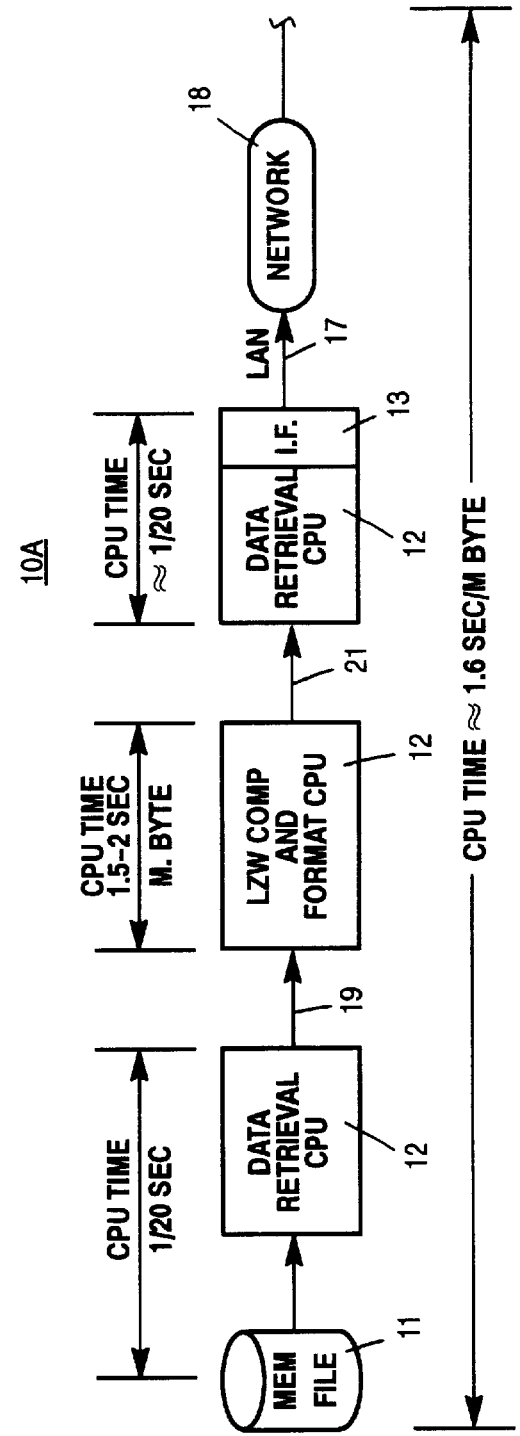
FIG. 2 is a schematic block diagram of the prior art mainframe computer of FIG. 1 showing the CPU processing time required to impose data compression process on the data streams.

Refer now to FIG. 2 showing a schematic block diagram of a prior art mainframe computer of the type shown in FIG. 1 where the mainframe computer is used to perform a data compression process on the data stream. The modified computing system 10A is shown having the identical memory file 11 coupled to a data retrieval mainframe computer 12. The computer 12 is coupled by a software connection 19 to the same data retrieval computer 12 which is programmed to perform a Lempel/Ziv/Welch (LZW) data compression algorithm. The computer 12 which performs the data compression process is software coupled via link 21 to the same data transmission computer 12 as explained above. Computer 12 is provided with an interface 13 which couples to a LAN network 17 and wide area network 18.

The same computing time of $\frac{1}{20}^{th}$ of 1 second is shown for the computer 12 to retrieve data from the file 11. The same transaction time of $\frac{1}{20}^{th}$ of 1 second is shown for the data transport process of CPU 12. However, interposed between data retrieval and data transport processes there is shown a time of 1.5–2 second per mega byte of data in the data stream to perform a data compression operation because of the computer cycle intensive algorithm (e.g. LZW). Thus the overall computing time of approximately 1.6 to 2.1 seconds per mega of data passing in the data stream is consumed when the mainframe computer is employed to perform all three processes noted.

Refer now to FIG. 3 showing a schematic block diagram of the preferred embodiment of the present invention. The system 20 is shown having a continuous flow path for data from a original file 11 into an enterprise transaction computer 12 which is provided with a high speed interface 13. Further, the transaction computer is provided with a software program 22 capable of determining when a difficult process should be off loaded to a dedicated computer. The data stream created by the CPU 12 is shown being transferred across a connection 23 which may be a cable, an internal bus or an external network connection that is coupled into an interface 24 of the dedicated computer 25. Computer 25 performs the difficult process and has a second or the same interface 26 which connects to a connection 17A which again may be a cable or a network interface connection. The internal bus 17A is shown connected to the high speed interface 14 of the transaction computer 12A which performs the transport process and outputs the continuous data stream to a connection 27. For purposes of the present illustration the connection 27 is a cable or link connection to a local new file 28. It will be understood that the same data stream may be outputted to the network 17, 18 which delivers the data stream to a file server (not shown) for producing a new file anywhere on the network. To compare FIG. 3 to the system shown in FIG. 2 and illustrate the present improvement a connection 17A is shown as a phantom line which connects via CPU 12A to the network 18 as explained hereinbefore. Thus, it will be understood that the dedicated computer 25 can deliver the stream of processed data directly to the network 18 for storage at remote new files located anywhere on the network.

Refer now to the CPU time shown as $\frac{1}{20}^{th}$ of 1 second per mega byte for delivering the data stream to the interface 24. Also note that the dedicated computer time for processing the difficult process is very fast and may be as small as $\frac{1}{10}^{th}$ of 1 second per mega byte for performing the LZW data compression algorithm. Further, CPU transaction time is shown as $\frac{1}{20}^{th}$ of 1 second per mega byte and represents more than the transaction time required for the transaction process at 12A and would require even less time if performed by the dedicated processor 25. The total time for performing the same process performed in less than 1.6 seconds in FIG. 2 is now shown to be performed in at least approximately in $\frac{1}{5}^{th}$ of 1 second thus unburdening the transaction processor 12 or 12A for other work. In the preferred embodiment of the present invention the dedicated processor may be a low cost Intel processor having a 200 mega hertz internal clock with Pentium II™ capabilities. Other processors for similar or higher performance costs well below $2000 and will perform the data compression process at higher speeds. When it is considered that the mainframe computers may cost several millions of dollars, the added cost of the dedicated processor is an insignificant item and more than pays for itself in conserving valuable mainframe computer time.

Refer now to FIG. 4 showing a schematic block diagram of steps that are employed in the data pipeline in FIG. 3 to achieve a continuous flow of data in an asynchronous mode of operation. An original file 11 is shown as a disk but may be any other form of memory which is accessible at high speeds from which data can be retrieved by the CPU 12 in a step labeled retrieval 29. After retrieving the information from the original file 11 it is placed in a first in first out (fifo) data queue shown as block 31. A LZW data compression algorithm is performed at step 32 in a continues nonstop mode using the information supplied by the queue 31. The data processed at the processing step 32 is then passed to a send fifo queue 33 to buffer the information before it is supplied to the data transaction CPU 12A to perform the data transmit step 34. Then CPU 12A can place the information on the LAN 17 for transmission over the network 18. As explained hereinbefore the data stream can be directly connected to a local file 28 for later use.

It will be appreciated that in some data transfer and file transfer systems the user or customer desires to create a data compressed archival file 28 for later use. Some customers desire to conserve memory space by performing the data compression techniques which are described in our U.S. Pat. No. 4,558,302 and 4,971,407. Such data compression techniques may compress the data to a format of one-half to one-seventh of the space previous used in a format which is data loss less.

Having explained a preferred embodiment of the present invention and alternatives or modification for the use of the system, it will be appreciated that the mainframe computer 12 usually has advanced knowledge of the type of processes it will be requested to perform. Thus, when the process is noted that becomes difficult (or has subprocess steps that are difficult) the mainframe computer 12 recognizes this, and is programmed at block 22 to down load or off load the difficult process onto a dedicated high speed processor 25 of the type described hereinbefore. Further, some difficult processes that may be performed more efficiently by the dedicated processor 25 will not process the data stream supplied at connection 23 as fast as the mainframe computer 12 can retrieve it from its original file. In this case the retrieval step 29 shown in FIG. 4 is operated in an intermitted fashion so as to maintain the fifo queue 31 full without the dedicated processor 25 knowing the speed at which the information is being retrieved. Thus, the mainframe computer 12 is free to perform other operations while intermittently loading the queue 31.

Having explained a preferred embodiment method and use of the present invention it will be appreciated that other difficult processes than data compression can be performed in the same manner to achieve economies of processing in a the mainframe computer system virtually without cost and the invention described herein is only limited by the claims appended hereto.

What is claimed is:

1. A method for decreasing the overall time for transmitting a compressed data file onto a network, comprising the steps of:

reading data from a data file at high speed employing a mainframe computer, determining that a compression process is to be performed on the data which requires more than twice the time required to read said data from said data file, down loading said data to a memory accessible by a single chip type dedicated computer which is capable of performing said compression process at a much greater speed than said mainframe computer, performing said compression process in said dedicated computer programmed to perform the process on said data, generating a stream of processed data representative of said compressed data file at an output port of said dedicated computer, and coupling said stream of compressed data to a communication network for transmittal to a new file.

2. A method as set forth in claim 1 wherein said dedicated computer comprises a motherboard and associated memory mounted in said mainframe computer.

3. A method as set forth in claim 2 wherein said dedicated computer comprises a low cost personal computer (PC) programmed to perform data compression and to produce said stream of processed data.

4. A method as set forth in claim 3 wherein said output port of said dedicated computer is coupled to a second first-in-first-out (FIFO) data queue.

5. A method as set forth in claim 4 wherein said second FIFO is coupled to said mainframe computer and further includes, writing said stream of processed data to a new file.

6. A method as set forth in claim 5 which further includes, reading said new file, and writing said new file onto a network communications line for transfer to a remotely located data file.

7. A method as set forth in claim 4 wherein said second FIFO is coupled to said mainframe computer and further includes, writing said stream of processed data on to a network communication line for transfer to a remotely located data file.

8. A method as set forth in claim 5 wherein said mainframe computer comprises means for reading and writing of data transactions at high speeds.

9. A method as set forth in claim 1 wherein said step of reading data is performed at speeds in excess of said dedicated computer to perform said compression process, and said step of down loading data to a memory comprises intermittently down loading blocks of data to the accessible memory to maintain a data supply to an input of said dedicated computer.

10. A method as set forth in claim 9 wherein said accessible memory comprises a first-in-first-out (FIFO) data queue.

11. A method as set forth in claim 10 wherein said FIFO data queue is mounted in said mainframe computer.

* * * * *